United States Patent
Yu et al.

(10) Patent No.: US 10,496,183 B2
(45) Date of Patent: Dec. 3, 2019

(54) NINE-GRID KEYBOARD WITH THE PRECISE FULL-PINYIN INPUT OF THE MINIMUM SYLLABLE-ORIENTED

(71) Applicants: Kejian Yu, Shaanxi (CN); Ning Yu, Shaanxi (CN); Li Wang, Shaanxi (CN); XIAN DIPAI INFORMATION TECH. CO., LTD, Xi'an, Shaanxi (CN)

(72) Inventors: Kejian Yu, Shaanxi (CN); Ning Yu, Shaanxi (CN); Li Wang, Shaanxi (CN)

( * ) Notice: Subject to any disclaimer, the term of this patent is extended or adjusted under 35 U.S.C. 154(b) by 0 days.

(21) Appl. No.: 16/345,918

(22) PCT Filed: Jul. 5, 2017

(86) PCT No.: PCT/CN2017/091803
§ 371 (c)(1),
(2) Date: Apr. 29, 2019

(87) PCT Pub. No.: WO2018/129878
PCT Pub. Date: Jul. 19, 2018

(65) Prior Publication Data
US 2019/0317611 A1    Oct. 17, 2019

(30) Foreign Application Priority Data
Jan. 10, 2017 (CN) .......................... 2017 1 0017066

(51) Int. Cl.
*G06F 3/023* (2006.01)
(52) U.S. Cl.
CPC .................. *G06F 3/0237* (2013.01)
(58) Field of Classification Search
CPC ........ G06F 1/1662; G06F 3/0237; G06F 3/02; G06F 3/0216
See application file for complete search history.

(56) References Cited

FOREIGN PATENT DOCUMENTS

| CN | 1265481 | 9/2000 |
|----|---------|--------|
| CN | 104461045 | 3/2015 |

(Continued)

OTHER PUBLICATIONS

International Search Report and Written Opinion of International Application No. PCT/CN2017/091803 dated Oct. 11, 2017.

*Primary Examiner* — Kent W Chang
*Assistant Examiner* — Chayce R Bibbee
(74) *Attorney, Agent, or Firm* — Ping Wang; Morris, Manning & Martin, LLP

(57) ABSTRACT

A Nine-Grid keyboard with the precise full-Pinyin input of the minimum syllable-oriented, characterized by: it consists of a Nine-Grid main-level keyboard with five additional vowel-finals keys, A, E, U, I and O, and combines the minimum syllable-oriented input sub-keyboards of eight full-mapping levels, and when the conversion conditions of Pinyin syllables are satisfied, the input key is clicked from the keys marked as 2-9 of main-level keyboard, so as to trigger switching to the input sub-keyboard of each mapping level, and any click input of the input sub-keyboard at each mapping level will return to the main-level keyboard, and the precise full-Pinyin input can be realized on the Nine-Grid keyboard through the minimum syllable-oriented and five additional vowel-finals keys. All keyboards of the embodiment of the invention are simplified to a fixed format, and removed the multiple Pinyin syllables prompt scrolling selection bar of the traditional Nine-Grid keyboard; the input complexity of the traditional Nine-Grid is obviously reduced; this new way of input changes "Post-Click Intervention Input" to "Click-and-Predict Input", and effectively improves input efficiency.

15 Claims, 1 Drawing Sheet

(56) References Cited

FOREIGN PATENT DOCUMENTS

| | | |
|---|---|---|
| CN | 106033318 | 10/2016 |
| CN | 106774988 | 5/2017 |
| WO | 0173594 | 10/2001 |

NINE-GRID KEYBOARD WITH THE PRECISE FULL-PINYIN INPUT OF THE MINIMUM SYLLABLE-ORIENTED

TECHNICAL FIELD

The invention relates to a Nine-Grid keyboard of the precise full-Pinyin input of the minimum syllable-oriented for touch screen computers, smart phones, smart watches and smart mobile devices, especially suitable for Chinese information input on touch screen computers, smart phones, smart watches and smart mobile devices.

BACKGROUND TECHNICAL

At present, Chinese character input technology in touch screen computers, smart phones, smart watches and smart mobile devices is becoming more and more mature, especially in the first decade of this century, the increasing popularity of smart mobile devices, in addition to keyboard input, handwriting input and voice input are also successful in their target group and specific areas. Despite this, as the most widely used traditional keyboard input, a new gesture input human-computer interaction mode has been developed on the touch screen keyboard; in particular, the rise of smart watches and other wearable mobile devices also raises new demands for interactive input. In the new application scenario, traditional keyboard input encounters new challenges, for example, the display interface of a smart watch is not comparable to that of a smart phone, this exposes some shortcomings of the traditional input keyboard, take the Nine-Grid keyboard as an example: the traditional Nine-Grid keyboard of smart phone can not achieve the precise full-Pinyin input, when inputting, a plurality of syllables are often combined, and when the Chinese character is prompted, a plurality of syllables are also mixed together, then select it from a scrollable input selection bar next to it, this combination can be as many as 420, a syllable input may have at least 7~14 optional combinations. Some well-known search+input companies try to solve these problems in different directions, for example, "Sogou Pinyin", "Google Pinyin" and "Baidu Pinyin" all increase the lexicon, word input and sentence input in the same way on smart phones, even more extreme is the introduction of cloud input combined with search to reduce input choices and improve input efficiency, but the complexity of Chinese language changes and the flexibility of the combination, in particular, the specific person names, places names and the addition, deletion, and change of texts are inputted, it is a test for the Nine-Grid Input Method, since the Nine-Grid keyboard is small number of keys and the click is easy, these shortcomings are accepted on the smart phone. However, these traditional solutions have the following obvious shortcomings:

1. Sentence and word input can't fundamentally cancel the scrollable input selection bar of the Nine-Grid input, word and sentence input can not replace the input of "basic Chinese characters", and the "basic Chinese characters" input has to rely on the choice of multiple syllables.
2. Smart watch can display smaller input interface, it is unbearable to often make such a scrolling choice during the input process. What's more, the choice of the traditional Nine-Grid input is doubled, after the choice of input Pinyin is finished, it is often necessary to filter out a syllable Chinese character after a second scrolling selection (the Chinese characters from a plurality of syllables are mixed together).
3. If you rely too much on sentence and long word, when the input needs to be modified in the middle of the input, it is often found that: the uncertainties caused by multiple syllables input become more and more serious, users often can't find the exact Pinyin syllable to be modified in a long string of input codes, can't do "what you input is what you see", so there are a few Nine-Grid input methods that simply do not allow modification in the middle, if the input is wrong all of them will overthrow and input again.
4. In practical use, the traditional Nine-Grid have the best selection effect when inputting Chinese character or basic words as far as possible, however, it is often found again adjusting and correcting after that the input prompt does not match, this invisibly becomes an extra disturbance to input, in essence, the traditional Nine-Grid input is a kind of "Post-Click Intervention Input".

In order to find a Nine-Grid input keyboard that does not require a multiple Pinyin syllables prompt scrolling selection bar, implement "Click-and-Predict Input", the invention designs a Nine-Grid keyboard with the precise full-Pinyin input of the minimum syllable-oriented: the traditional single level Nine-Grid input keyboard is expanded to, it consists of a Nine-Grid main-level keyboard with five additional vowel-finals keys A, E, U, I and O, and combines the minimum syllable-oriented input sub-keyboards of eight full-mapping levels, this Nine-Grid keyboard with the precise full-Pinyin input of the minimum syllable-oriented, in a limited (and single-level same size) physical keyboard interface, it can accommodate up to 8×9 the minimum syllable-oriented keys, and lays the foundation for the precise full-Pinyin input.

After the innovation of the invention, this Nine-Grid keyboard with the precise full-Pinyin input of the minimum syllable-oriented, that can completely remove two (one for syllable input and one for Chinese character selection) multiple Pinyin syllables prompt scrolling selection bars, instead, adds five additional vowel-finals fixed keys A, E, U, I and O, and contains the minimum syllable-oriented input sub-keyboards of eight full-mapping levels of implement "Click-and-Predict Input". This fixed and simplified interface of the Nine-Grid keyboard is more adaptable to the demanding small size requirements of mobile wearable devices such as smart watches; because of the implement of the precise Pinyin input, the single Pinyin re-code is much lower than the multiple syllables Pinyin re-code, which improves the input efficiency and accuracy of the traditional Nine-Grid keyboard; the solution of the invention also fully shows that: this kind of "Click-and-Predict Input" has the advantage of more natural and smoother input than the traditional Nine-Grid "Post-Click Intervention Input".

SUMMARY OF THE INVENTION

The task of the invention is to design a Nine-Grid keyboard with the precise full-Pinyin input of the minimum syllable-oriented in touch screen computers, smart phones, smart watches and smart mobile devices, the characteristics are:

it consists of a Nine-Grid main-level keyboard with five additional vowel-finals keys, A, E, U, I and O, and combines the minimum syllable-oriented input sub-keyboards of eight full-mapping levels, and when the conversion conditions of Pinyin syllables are satisfied, the input key is clicked from the keys marked as 2-9 of main-level keyboard, so as to trigger switching to the input sub-keyboard of each mapping level, and any click input of the input sub-keyboard at each mapping level will return to the main-level keyboard, and the precise full-Pinyin input can be realized on the Nine-Grid keyboard through the minimum syllable-oriented and five additional vowel-finals keys;

wherein, the Nine-Grid main-level keyboard and the minimum syllable-oriented input sub-keyboards of each full-mapping levels are arranged in three important partitions:

1. Five vowel-finals keys A, E, U, I and O are added, it means that all Chinese finals with zero initials can be input independently, and it also lays the foundation for the independent input of all finals.
2. After the ABC key of the standard Nine-Grid keyboard is marked as BCA key, the DEF key as DFE key, the MNO key as NMO key, and the JKL key as KJL key. The first initials B, D, G, K, N, P, T and W of the eight letters keys in the main-level keyboard can be input and displayed on the screen by clicking on the eight minimum syllable candidate initials. These are called candidate initials because: these initials do not need to constitute the minimum syllable-oriented to occupy a limited space (only 9 at each mapping level) containing the minimum syllable-oriented key, for example, P and W are not involved at all. The eight candidate initials and the five vowel-finals keys A, E, U, I, and O can be independently input their associated Pinyin syllables, wherein, the two initials of N and G are particularly important, they are both initials and also combined with the five vowel-finals of A, E, U, I, and O to form the ending letter of the finals, so a segmentation rule is needed to distinguish between the two. Because the letters of the keys marked as 2-9 contain different numbers of initials, for example, GHI key is 2 and PQRS key is 4, So the remaining initials of the first letter removed are the preferred initials, when the minimum syllable-oriented keys of preferred initials are of fewer syllable combinations sometimes leaves vacancy keys at each mapping level, at this time, and part of the minimum syllable combinations of the candidate initials can occupy these vacancy keys. Therefore, this part of the minimum syllable combinations of the candidate initials can be independently input with five additional vowel-finals keys, and also be input from (partially supplemented) the nine minimum syllable-oriented keys.
3. The preferred initials and vowel-finals be combined to the minimum syllable-oriented keys, there are a total of 12 single initials, since they can't be individually clicked on, the minimum syllable-oriented keys of all preferred initials and vowel-finals effective combinations should be distributed at a certain full-mapping level or at the adjacent vacancies of the minimum syllable-oriented keys of full-mapping level, when the minimum syllable-oriented keys of all preferred initials and vowel-finals effective combinations are full. For example, when the minimum syllable-oriented keys of all preferred initials and vowel-finals effective combinations are full for PQRS and WXYZ, the adjacent vacancy keys of the TUV key can arrange the eight preferred initials and vowel-finals effective combinations se, si, so, su, so, ze, zi, zo, and zu for the PQRS and WXYZ of full mapping levels. The double initials keys zh, ch, sh and special finals er, which are equally important to the minimum syllable-oriented keys, are not the minimum syllable-oriented keys, and are the four special cases of the extension of the definition of the minimum syllable-oriented keys, they should also occupy the important oriented keys.

The trigger switching for keyboard layout is specifically: the layout and trigger switching of the main-level keyboard and the minimum syllable-oriented input sub-keyboards of all full-mapping levels are as follows:

the eight-letter keys marked as 2-9 of main-level keyboard click triggers switching to input sub-keyboards of full-mapping levels, when the initial click of each Pinyin syllable is inputted or when the character terminator """" is inputted before clicking, and the input sub-keyboards of full-mapping levels switch back to the main-level keyboard every time the input is clicked;

when the input Pinyin syllable is not finished, the eight-letter keys marked as 2-9 of the main-level keyboard click input the GHI or NMO key, and the main-level keyboard remains unchanged, that is, only the lowercase letter g or n of the corresponding key of the main keyboard is inputted;

when the current input is one of the five additional vowel-finals keys "A, E, U, I, O" of the main-level keyboard, the main-level keyboard remains unchanged;

when the current input is one of the five additional vowel-finals keys "A, E, U, I, O" of the input sub-keyboards of full-mapping levels, it directly results in the switch from the the input sub-keyboards of full-mapping levels to the main-level keyboard;

the precise Pinyin input refers to the traditional Nine-Grid input usually has multiple Pinyin syllables, and the precise Pinyin input Pinyin syllables are uniquely determined.

What is worthy of attention for the solution of the invention is the complexity of the input, and the resulting learning cost. In fact, this is also the focus of the solution of the invention. First of all, the input of each Pinyin starts from the main level keyboard, about this, the user does not need to learn. Secondly, although the majority of the subsequent input of the syllable is switched to the minimum syllable-oriented input sub-keyboard of the full-mapping level, however, the invention follows:

the four special cases of the extension of the definition of the minimum syllable-oriented keys are described, the double initials zh, ch, sh and the special finals er click the first two keys positions and the traditional Nine-Grid pinyin input clicks the first two letters of the keys positions are consistent; the same full-mapping level arranges the minimum syllable-oriented keys of the preferred initials and vowel-finals combinations, the positions of the first two clicks are consistent with the positions of the first two letters of the traditional Nine-Grid Pinyin input; the user who is used to the traditional Nine-Grid input has the lowest learning cost. In other words, in most cases, user clicks on the first two keys input and the traditional Nine-Grid input is highly consistent. Then, if user continues to input a compound finals with more than two letters, just clicks on the main-level keyboard (five additional vowel-finals keys A, E, U, I, O plus N, G two candidate initials) a total of seven keys, it can be done in one go, user does not need to learn extra. Thus it can be seen that, from the starting of a Pinyin syllable click, second middle clicks, until the end, It is as close as possible to the traditional Nine-Grid input, but it has realized the leap from uncertain multiple syllables selection input to precise full-Pinyin input. It also completely simplifies and removes the multiple Pinyin syllables prompt scrolling selection bar of the traditional Nine-Grid Keyboard. What's better is: five additional vowel-finals keys A, E, U, I, and O also support pop-up keyboard sliding input, at the same time, eight full-mapping level oriented input sub-keyboards also support pop-up keyboard sliding input compound finals of over 3 letters. It further speeds up the input speed of long compound finals. For example: for input Pinyin guang, you just click the GHI key once to input the candidate initials g, then slide from the U key to input uang, only one click and one sliding to complete; or first you click the GHI key to input the candidate initials g, then from the minimum syllable oriented sub-keyboard, press and hold the gu key and slide to input ".a ŋ " ( ŋ is an abbreviation for ng), it is also the same as only one click and one sliding to complete the input of Pinyin guang; even if all the input is clicked, only five clicks are needed to uniquely determine the Pinyin guang; after clicking 5 times on the traditional Nine-Grid keyboard, you still can't sure whether the input is Pinyin huang or guang? it is also necessary to add a multiple syllables prompt selection to uniquely determine Pinyin guang.

This fully confirms that the Nine-Grid keyboard with the precise full-Pinyin input of the minimum syllable-oriented of the "Click-and-Predict Input", it is a level higher than the "Post-Click Intervention Input" of the traditional Nine-Grid keyboard.

BRIEF DESCRIPTION OF THE DRAWINGS

In the drawings of the specification, the nine detailed layouts of the minimum syllable-oriented precise Pinyin input Nine-Grid keyboard are given respectively: in the figure.

FIG. 2 is the BCA key marked as 2, and the click input will trigger the switching to input sub-keyboard of full-mapping level, the remaining three keys positions of the preferred initials and vowel-finals effective combinations complementarily arrange the candidate initials and vowel-finals effective combinations ba, bi, and bu.

DETAILED DESCRIPTION OF THE EMBODIMENT

Figure 1:
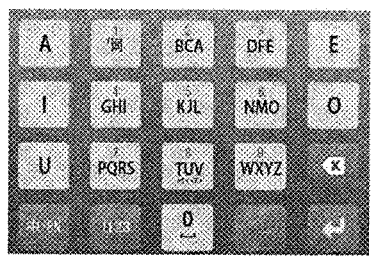
FIG. 1 is the main level keyboard, five vowel-finals keys A, E, U, I, and O are added, the ABC key of the standard Nine-Grid keyboard is marked as BCA key, the DEF key as DFE key, the MNO key as NMO key, and the JKL key as KJL key; the ".s . . . z." below the TUV key indicates that the s/z minimum syllable-oriented keys is arranged in the adjacent syllable-oriented input sub-keyboard, in "FIG. 7, FIG. 8, FIG. 9" for details.
Figure 2:
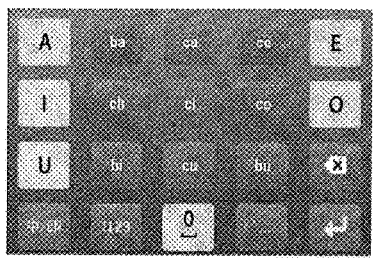
"FIG. 2" to "FIG. 9" are the eight mapping level-oriented input sub-keyboards, the color of the nine minimum syllable-oriented keys of each sub-keyboard is different from the color of the key marked as 1-9 of the main level keyboard.
Figure 3:
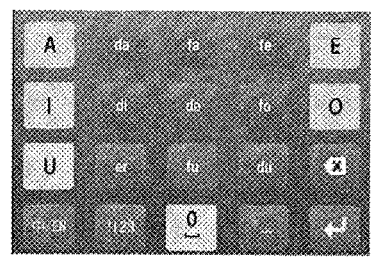
FIG. 3 is the DFE key marked as 3, and the click input will trigger the switching to input sub-keyboard of full-mapping level, the remaining four keys positions of the preferred initials and vowel-finals effective combinations complementarily arrange the candidate initials and vowel-finals effective combinations da, di, de, and du.
Figure 4:
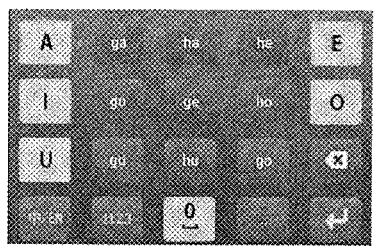
FIG. 4 is the GUI key marked as 4, and the click input will trigger the switching to input sub-keyboard of full-mapping level, on this mapping level, because both the preferred and candidate initials and vowel-finals effective combinations, after all the arrangements are completed, there is still another vacancy key, so the candidate initials and vowel-finals effective combination "go" appeared twice.
Figure 5:
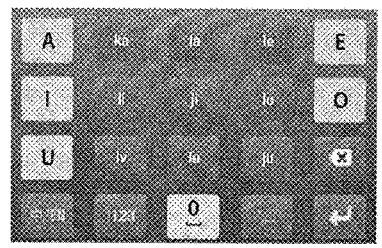
FIG. 5 is the KJL key marked as 5, and the click input will trigger the switching to input sub-keyboard of full-mapping level, the remaining one key position of the preferred initials and vowel-finals effective combination complementarily arranges the candidate initials and vowel-finals effective combinations ka.
Figure 6:
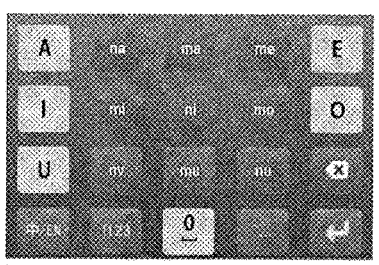
FIG. 6 is the NMO key marked as 6, and the click input will trigger the switching to input sub-keyboard of full-mapping level, the remaining four keys positions of the preferred initials and vowel-finals effective combinations complementarily arrange the candidate initials and vowel-finals effective combinations na, ni, nv, and nu.
Figure 7:
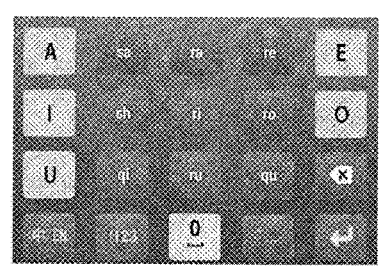
FIG. 7 is the PQRS key marked as 7, and the click input will trigger the switching to input sub-keyboard of full-mapping level, the mapping level is so crowded that it is impossible to arrange the candidate initials P and vowel-finals effective combinations, and even the preferred initials S and vowel-finals effective combination is only arranged a sa, the remaining four are arranged at the mapping level of adjacent TUV key.
Figure 8:
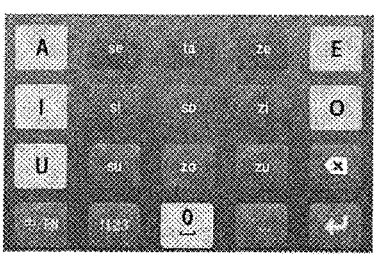
FIG. 8 is the TUV key marked as 8, and the click input will trigger the switching to input sub-keyboard of full-mapping level, there is no preferred initials at this mapping level, So 8 of the 9 vacancy keys are loaned to the adjacent PQRS and WXYZ to arrange the remaining preferred initials and vowel-finals effective combinations, It only takes up 1 candidate initials and vowel-finals effective combination to key.
Figure 9:
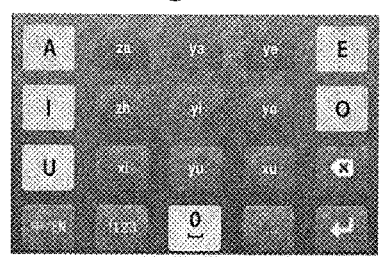
FIG. 9 is the WXYZ key marked as 9, and the click input will trigger the switching to input sub-keyboard of full-mapping level, the mapping level is so crowded that it is impossible to arrange the candidate initials W and vowel-finals effective combinations, and even the preferred initials Z and vowel-finals effective combination is only arranged a za, the remaining four are arranged at the mapping level of adjacent TUV key.

Two specific embodiment of the invention are given below, and other features of the invention can be understood from examples.

1. The Nine-Grid Input Keyboard Solution as a Smart Phone

In this embodiment, the Nine-Grid keyboard with the precise full-Pinyin input of the minimum syllable-oriented, the traditional Nine-Grid keyboard is extended with five additional vowel-finals keys A, E, U, I and O, and combines the minimum syllable-oriented input sub-keyboards of eight full-mapping levels. All keys of the main-level keyboard in the embodiment of the invention are simplified to a fixed format, and removed the multiple Pinyin syllables prompt scrolling selection bar of the traditional Nine-Grid keyboard, the input complexity of the traditional Nine-Grid is obviously reduced. The total number of multiple syllable selection of the traditional Nine-Grid keyboard is about 420, the minimum syllable-oriented keys at eight full-mapping levels can be selected as 8×9=72, it is only about ⅙ of the original selection. If we consider that these 420 or so are just the first selection of syllables for Pinyin input, then, it is often necessary for the second filtering of Chinese character prompts with multiple syllables crossed and mixed, so that a single syllable Chinese character prompt is selected, this filtering selection also has as many as 420 or so; the invention solution in this embodiment is itself a precise full-Pinyin input, the Chinese character prompt is only one syllable, and there is no Chinese character prompt with multiple syllables crossed and mixed, naturally, there is no need for up to 420 filtering selections, at the same time, the Chinese character re-code prompt that appears every time is only about ⅓ to ¼ of the original, therefore, the traditional Nine Grid input keyboard on smart phones has been greatly simplified. In addition, the traditional Nine-Grid input selection is "Post-Click Intervention Input", it often requires a special multiple syllable selection input action, the solution of the invention is "Click-and-Predictive Input", the first click input predicts the next possible click key, therefore, there is no extra action to input and click to select. This helps to improve the input efficiency of smart phones and keeps the input and prompt Pinyin syllables natural and synchronized.

Wherein, the Nine-Grid main-level keyboard and the minimum syllable-oriented input sub-keyboards of each full-mapping levels are arranged in three important partitions:

1. Five vowel-finals keys A, E, U, I and O are added, it means that all Chinese finals with zero initials can be input independently, and it also lays the foundation for the independent input of all finals.

2. After the ABC key of the standard Nine-Grid keyboard is marked as BCA key, the DEF key as DFE key, the MNO key as NMO key, and the JKL key as KJL key. The first initials B, D, G, K, N, P, T and W of the eight letters keys in the main-level keyboard can be input and displayed on the screen by clicking on the eight minimum syllable candidate initials. These are called candidate initials because: these initials do not need to constitute the minimum syllable-oriented to occupy a limited space (only 9 at each mapping level) containing the minimum syllable-oriented key, for example, P and W are not involved at all. The eight candidate initials and the five vowel-finals keys A, E, U, I, and O can be independently input their associated Pinyin syllables, wherein, the two initials of N and G are particularly important, they are both initials and also combined with the five vowel-finals of A, E, U, I, and O to form the ending letter of the finals, so a segmentation rule is needed to distinguish between the two. Because the letters of the keys marked as 2-9 contain different numbers of initials, for example, GHI key is 2 and PQRS key is 4, So the remaining initials of the first letter removed are the preferred initials, when the minimum syllable-oriented keys of preferred initials are of fewer syllable combinations sometimes leaves vacancy keys at each mapping level, at this time, and part of the minimum syllable combinations of the candidate initials can occupy these vacancy keys. Therefore, this part of the minimum syllable combinations of the candidate initials can be independently input with five additional vowel-finals keys, and also be input from (partially supplemented) the nine minimum syllable-oriented keys.

3. The preferred initials and vowel-finals be combined to the minimum syllable-oriented keys, there are a total of 12 single initials, since they can't be individually clicked on, the minimum syllable-oriented keys of all preferred initials and vowel-finals effective combinations should be distributed at a certain full-mapping level or at the adjacent vacancies of the minimum syllable-oriented keys of full-mapping level, when the minimum syllable-oriented keys of all preferred initials and vowel-finals effective combinations are full. For example, when the minimum syllable-oriented keys of all preferred initials and vowel-finals effective combinations are full for PQRS and WXYZ, the adjacent vacancy keys of the TUV key can arrange the eight preferred initials and vowel-finals effective combinations se, si, so, su, so, ze, zi, zo, and zu for the PQRS and WXYZ of full mapping levels. The double initials keys zh, ch, sh and special finals er, which are equally important to the minimum syllable-oriented keys, are not the minimum syllable-oriented keys, and are the four special cases of the extension of the definition of the minimum syllable-oriented keys, they should also occupy the important oriented keys.

The trigger switching for keyboard layout is specifically: the layout and trigger switching of the main-level keyboard and the minimum syllable-oriented input sub-keyboards of all full-mapping levels are as follows:

the eight-letter keys marked as 2-9 of main-level keyboard click triggers switching to input sub-keyboards of full-mapping levels, when the initial click of each Pinyin syllable is inputted or when the character terminator """ is inputted before clicking, and the input sub-keyboards of full-mapping levels switch back to the main-level keyboard every time the input is clicked;

when the input Pinyin syllable is not finished, the eight-letter keys marked as 2-9 of the main-level keyboard click input the GHI or NMO key, and the main-level keyboard remains unchanged, that is, only the lowercase letter g or n of the corresponding key of the main keyboard is inputted;

when the current input is one of the five additional vowel-finals keys "A, E, U, I, O" of the main-level keyboard, the main-level keyboard remains unchanged;

when the current input is one of the five additional vowel-finals keys "A, E, U, I, O" of the input sub-keyboards of full-mapping levels, it directly results in the switch from the input sub-keyboards of full-mapping levels to the main-level keyboard;

the precise Pinyin input refers to the traditional Nine-Grid input usually has multiple Pinyin syllables, and the precise Pinyin input Pinyin syllables are uniquely determined.

What is worthy of attention for the solution of the invention is the complexity of the input, and the resulting learning cost. In fact, this is also the focus of the solution of the invention. First of all, the input of each Pinyin starts from the main level keyboard, about this, the user does not need to learn. Secondly, although the majority of the subsequent input of the syllable is switched to the minimum syllable-oriented input sub-keyboard of the full-mapping level, however, the invention follows:

the four special cases of the extension of the definition of the minimum syllable-oriented keys are described, the double initials zh, ch, sh and the special finals er click the first two keys positions and the traditional Nine-Grid pinyin input clicks the first two letters of the keys positions are consistent; the same full-mapping level arranges the minimum syllable-oriented keys of the preferred initials and vowel-finals combinations, the positions of the first two clicks are consistent with the positions of the first two letters of the traditional Nine-Grid Pinyin input; the user who is used to the traditional Nine-Grid input has the lowest learning cost. In other words, in most cases, user clicks on the first two keys input and the traditional Nine-Grid input is highly consistent. Then, if user continues to input a compound finals with more than two letters, just clicks on the main-level keyboard (five additional vowel-finals keys A, E, U, I, O plus N, G two candidate initials) a total of seven keys, it can be done in one go, user does not need to learn extra. Thus it can be seen that, from the starting of a Pinyin syllable click, second middle clicks, until the end, It is as close as possible to the traditional Nine-Grid input, but it has realized the leap from uncertain multiple syllables selection input to precise full-Pinyin input. It also completely simplifies and removes the multiple Pinyin syllables prompt scrolling selection bar of the traditional Nine-Grid Keyboard.

What's better is: five additional vowel-finals keys A, E, U, I, and O also support pop-up keyboard sliding input, at the same time, eight full-mapping level oriented input sub-keyboards also support pop-up keyboard sliding input compound finals of over 3 letters. It further speeds up the input speed of long compound finals. For example: for input Pinyin guang, you just click the GHI key once to input the candidate initials g, then slide from the U key to input uang, only one click and one sliding to complete; or first you click the GHI key to input the candidate initials g, then from the minimum syllable oriented sub-keyboard, press and hold the gu key and slide to input ".a ŋ" ( ŋ is an abbreviation for ng), it is also the same as only one click and one sliding to complete the input of Pinyin guang; even if all the input is clicked, only five clicks are needed to uniquely determine the Pinyin guang; after clicking 5 times on the traditional Nine-Grid keyboard, you still can't sure whether the input is Pinyin huang or guang? it is also necessary to add a multiple syllables prompt selection to uniquely determine Pinyin guang.

This fully confirms that the Nine-Grid keyboard with the precise full-Pinyin input of the minimum syllable-oriented of the "Click-and-Predict Input", it is a level higher than the "Post-Click Intervention Input" of the traditional Nine-Grid keyboard.

Special mention is: the specific implementation of the invention on the smart phone allows the user to perform precise Pinyin input in a variety of ways, the first method is similar to the traditional Nine-Grid input, all using click input, but the effect of clicking on the input is the precise Pinyin; the second method uses only the main keyboard initials and finals to use sliding input, it is a precise Pinyin input with twice sliding; the third method is a hybrid input mode of clicking and sliding, this is a precise Pinyin input method with much higher input efficiency than the traditional Nine-Grid input, at the same time, it is the only precise Pinyin efficient hybrid input solution in all Nine-Grid Chinese input that can achieve the combination of clicking and sliding so far.

2. The Nine-Grid Input Keyboard Solution as a Smart Watch

This embodiment is more attractive and competitive as the Nine-Grid Input keyboard solution of smart watches. Smart watches are not the same size as smart phone interfaces, and the requirements for keyboard input will be more stringent! between small area size of smart watches, it is difficult to operate and imagine that complex multiple syllable selections and Chinese character filtering selections are needed in the traditional Nine-Grid input. Therefore, there is an urgent need for a keyboard with simpler input interface and more efficient input, this seems to be completely contradictory and almost unimaginable. In this case, the Nine-Grid keyboard with the precise Pinyin input of the minimum syllable-oriented came into being. Compared to the 26-letter keys of the standard QWERTY keyboard, the solution of the invention has a simple interface, the main-level keyboard keys are fixed and easy to operate, more importantly, there are only five fixed keys per line, compared to the QWERTY keyboard with 10 keys in per line, it is half less, therefore, the key size is relatively large, and the operation is naturally convenient.

If the smart watch only uses the click input mode, it can greatly simplify the input solution of the smart watch, thus, the pop-up keyboards of the main-level keyboard and the eight sub-level keyboards can be omitted, it is more conducive to adapting to the small area size of smart watch dial. However, it still enjoys the high efficiency of the Pinyin input of the precise syllable-oriented.

The present solution is completely suitable for square watch dials, for the circular watch dial, the key position of the solution needs to be adjusted correspondingly with the watch dial size in the specific implementation.

What is claimed is:

1. A Nine-Grid keyboard with the precise full-Pinyin input of the minimum syllable-oriented, characterized by:
   it consists of a Nine-Grid main-level keyboard with five additional vowel-finals keys, A, E, U, I and O, and combines the minimum syllable-oriented input sub-keyboards of eight full-mapping levels, and when the conversion conditions of Pinyin syllables are satisfied, the input key is clicked from the keys marked as 2-9 of main-level keyboard, so as to trigger switching to the input sub-keyboard of each mapping level, and any click input of the input sub-keyboard at each mapping level will return to the main-level keyboard, and the precise full-Pinyin input can be realized on the Nine-Grid keyboard through the minimum syllable-oriented and five additional vowel-finals keys;
   wherein, the layout and trigger switching of the Nine-Grid main-level keyboard and the minimum syllable-oriented input sub-keyboards of full-mapping levels are as follows:
   the Nine-Grid main-level keyboard is arranged as follows:
   the ABC key of the standard Nine-Grid keyboard is marked as BCA key, the DEF key as DFE key, the MNO key as NMO key, and the JKL key as KJL key;
   in addition, the vowel-finals A key is added on the far left side of the first line, the vowel-finals E key is added on the far right side of the first line, the vowel-finals I key is added on the far left side of the second line, the vowel-finals O key is added on the far right side of the second line, and the vowel-finals U key is added on the far left side of the third line;
   the oriented input sub-keyboards of the eight full-mapping levels are arranged as follows:
   each contains nine different the minimum syllable-oriented keys, whose mapping positions correspond to the keys marked as 1-9 on the main level keyboard one by one, and the other auxiliary keys are exactly the same as the five additional vowel-finals keys A, E, U, I, O on the main-level keys, wherein, the minimum syllable-oriented keys are:
   the minimum syllable consists of one initials and one of the six vowel-finals a, e, u, v, i, and o, which contain two letters, the first initials of the eight letter keys BCA, DFE, GHI, KJL, NMO, PQRS, TUV and WXYZ in the main-level keyboard is the minimum syllable candidate initials; and the underlined initials are the minimum syllable preferred initials;
   the minimum syllable-oriented keys of all preferred initials and vowel-finals effective combinations should be distributed at a certain full-mapping level or at the adjacent vacancies of the minimum syllable-oriented keys of full-mapping level, when the minimum syllable-oriented keys of all preferred initials and vowel-finals effective combinations are full; the minimum syllable candidate initials click can be on-screen displayed, and part of the minimum syllable of the candidate initials combinations can occupy the remaining vacancies after arranged the minimum syllable of all preferred initials and vowel-finals combinations in the same full-mapping level;

the double initials keys zh, ch, sh and special finals er, which are equally important to the minimum syllable-oriented keys of all preferred initials and vowel-finals combinations, are not the minimum syllable combination, and are the four special cases of the extension of the definition of the minimum syllable-oriented keys;

the main-level keyboard and each full-mapping levels with the minimum syllable-oriented input sub-keyboards trigger switching is specifically:

the eight-letter keys marked as 2-9 of main-level keyboard click triggers switching to input sub-keyboards of full-mapping levels, when the initial click of each Pinyin syllable is inputted or when the character terminator """ is inputted before clicking, and the input sub-keyboards of full-mapping levels switch back to the main-level keyboard every time the input is clicked;

when the input Pinyin syllable is not finished, the eight-letter keys marked as 2-9 of the main-level keyboard click input the GHI or NMO key, and the main-level keyboard remains unchanged, that is, only the lower-case letter g or n of the corresponding key of the main keyboard is inputted;

when the current input is one of the five additional vowel-finals keys "A, E, U, I, O" of the main-level keyboard, the main-level keyboard remains unchanged;

when the current input is one of the five additional vowel-finals keys "A, E, U, I, O" of the input sub-keyboards of full-mapping levels, it directly results in the switch from the input sub-keyboards of full-mapping levels to the main-level keyboard;

the precise Pinyin input refers to the traditional Nine-Grid input usually has multiple Pinyin syllables, and the precise Pinyin input Pinyin syllables are uniquely determined.

2. The Nine-Grid keyboard with the precise full-Pinyin input of the minimum syllable-oriented according to claim 1, the eight-letter keys marked as 2-9 of the main level keyboard can be clicked input or long-pressed to pop up the extended keyboard slide input, the pop-up extended keyboard is arranged as:

the BCA key pops up the keyboard of the four keys of a, b, c, and ch, the DFE key pops up the keyboard of the three keys of d, e, and f, the GHI key pops up the keyboard of the three keys of g, h, and i, the KJL key pops up the keyboard of the three keys of j, k, and l, the NMO key pops up the keyboard of the three keys of m, n, and o, the PQRS key pops up the keyboard of the five keys of p, q, r, s, and sh, the TUV key pops up the keyboard of the three keys of t, u, and v, the WXYZ key pops up the keyboard of the five keys of w, x, y, z, and zh;

wherein, the five additional vowel-finals keys A, E, U, I, and O are attached to the main level keyboard and also attached to the input sub-keyboard of each mapping level, and the positions are exactly the same, these five additional keys can be clicked on the input as well as by long pressing to pop up the extended keyboard slide input, the pop-up extended keyboard layouts are:

the A key pops up the keyboard of the five finals keys of a, ai, an, ao, and ang of beginning with vowel-finals a ,are arranged in a single line;

the E key pops up the keyboard of the five finals keys of er, ei, en, eng, and e of beginning with vowel-finals e, are arranged in a single line;

the U key pops up the keyboard of the ten finals keys of ua, uai, uan, uang, v, ue, ui, un, uo, and u of beginning with vowel-finals u ,are arranged in two lines;

the I key pops up the keyboard of the ten finals keys of ia, iong, iang, ie, iu, in, ing, ian, iao, and i of beginning with vowel-finals i ,are arranged in two lines;

the O key pops up the keyboard of the three finals keys of ou, ong, and o beginning with vowel-finals o,are arranged in single line.

3. The Nine-Grid keyboard with the precise full-Pinyin input of the minimum syllable-oriented according to claim 1, the positions of the nine the minimum syllable-oriented keys under the same syllable-oriented input sub-keyboard can be freely interchanged, wherein, the layout of the syllable-oriented input sub-keyboard of the eight full-mapping levels is characterized by:

the four special cases of the extension of the definition of the minimum syllable-oriented keys are described, the double initials zh, ch, sh and the special finals er click the first two keys positions and the traditional Nine-Grid pinyin input clicks the first two letters of the keys positions are consistent.

4. The Nine-Grid keyboard with the precise full-Pinyin input of the minimum syllable-oriented according to claim 1, wherein, when the BCA key marked as 2 of the main-level keyboard is clicked the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

ba, ca, and ce are in the first line, ch, ci, and co are in the second line, and bi, cu, and bu are in the third line;

when the BCA key marked as 2 of the main-level keyboard is clicked, it is triggered to switch to the syllable-oriented input sub-keyboard of the full-mapping level, and input the prompt candidate initials b at the same time;

if the ca key of the above minimum syllable-oriented keys is clicked, the input correction prompts as ca, if the e key of the five additional vowel-finals keys is clicked, the input prompts as be, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys;

wherein, when the DFE key marked as 3 of the main-level keyboard is clicked the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

da, fa, and fe are in the first line, di, de, and fo are in the second line, and er, fu, and du are in the third line;

when the DFE key marked as 3 of the main-level keyboard is clicked, it is triggered to switch to the syllable-oriented input sub-keyboard of the full-mapping level, and input the prompt candidate initials d at the same time;

if the fa key of the above minimum syllable-oriented keys is clicked, the input correction prompts as fa, if the e key of the five additional vowel-finals keys is clicked, the input prompts as de, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys;

wherein, when the GHI key marked as 4 of the main-level keyboard is clicked the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

ga, ha, and he are in the first line, go, ge, and ho are in the second line, and gu, hu, and go are in the third line;

when the GHI key marked as 4 of the main-level keyboard is clicked, if the previous letter entered is n, then the direct input prompt will be g, indicating that the input syllable is not finished, ng may be combined into a compound finals, and the main level keyboard remains unchanged;

when the previous letter before inputting g is the other letter of excepting n or the previous symbol is the character terminator """ of the Pinyin syllable, it is triggered to switch to the syllable-oriented input sub-keyboard of the full-mapping level, and input the prompt candidate initials g at the same time;

if the ha key of the above minimum syllable-oriented keys is clicked, the input correction prompts as ha, if the e key of the five additional vowel-finals keys is clicked, the input prompts as ge, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys;

wherein, when the KJL key marked as 5 of the main-level keyboard is clicked, the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

ka, la, and le are in the first line, li, ji, and lo are in the second line, and lv, lu, and ju are in the third line;

when the KJL key marked as 5 of the main-level keyboard is clicked, it is triggered to switch to the syllable-oriented input sub-keyboard of the full-mapping level, and input the prompt candidate initials k at the same time;

if the la key of the above minimum syllable-oriented keys is clicked, the input correction prompts as la, if the e key of the five additional vowel-finals keys is clicked, the input prompts as ke, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys;

wherein, when the NMO key marked as 6 of the main-level keyboard is clicked, the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

na, ma, and me are in the first line, mi, ni, and mo are in the second line, and nv, mu, and nu are in the third line;

if the previous letter inputted is a vowel-finals a, e, u, i, and o or the first two letters of the input are a special combination of double-finals ia, io, and ua, then the direct input prompt will be n, indicating that the input syllable is not finished, n may be combined into a compound finals, and the main level keyboard remains unchanged;

when the previous letter before inputting n is the other letter of excepting vowel-finals a, e, u, i, o and the first two letters of the input are other combination of excepting double-finals ia, io, and ua, or the previous symbol is the character terminator """ of the Pinyin syllable, it is triggered to switch to the syllable-oriented input sub-keyboard of the full-mapping level, and input the prompt candidate initials n at the same time;

if the ma key of the above minimum syllable-oriented keys is clicked, the input correction prompts as ma, if the e key of the five additional vowel-finals keys is clicked, the input prompts as ne, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys.

5. The Nine-Grid keyboard with the precise full-Pinyin input of the minimum syllable-oriented according to claim 1, when the minimum syllable-oriented keys of all preferred initials and vowel-finals effective combinations is full, others effective combinations should be distributed at the adjacent vacancies of the minimum syllable-oriented keys of full-mapping level, the characteristics are:

the PQRS and WXYZ are the adjacent key positions of the TUV key respectively, when the minimum syllable-oriented keys of all preferred initials and vowel-finals effective combinations is full from the corresponded PQRS and WXYZ full-mapping level, the TUV key's vacancies of the minimum syllable-oriented respectively arrange the remaining eight keys of preferred initials and vowel-finals effective combinations from the PQRS and WXYZ full-mapping level.

6. The Nine-Grid keyboard with the precise full-Pinyin input of the minimum syllable-oriented according to claim 1, wherein, when the PQRS key marked as 7 of the main-level keyboard is clicked the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

sa, ra, and re are in the first line, sh, ri, and ro are in the second line, and qi, ru, and qu are in the third line;

when the PQRS key marked as 7 of the main-level keyboard is clicked, it is triggered to switch to the syllable-oriented input sub-keyboard of the full-mapping level, and input the prompt candidate initials p at the same time;

if the ra key of the above minimum syllable-oriented keys is clicked, the input correction prompts as ra, if the e key of the five additional vowel-finals keys is clicked, the input prompts as pe, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys.

7. The Nine-Grid keyboard with the precise full-Pinyin input of the minimum syllable-oriented according to claim 1, wherein, when the TUV key marked as 8 of the main-level keyboard is clicked, the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

se, ta, and ze are in the first line, si, so, and zi are in the second line, and su, zo, and zu are in the third line;

when the TUV key marked as 8 of the main-level keyboard is clicked, it is triggered to switch to the syllable-oriented input sub-keyboard of the full-mapping level, and input the prompt candidate initials t at the same time;

if the ze key of the above minimum syllable-oriented keys is clicked, the input correction prompts as ze, If the e key of the five additional vowel-finals keys is clicked, the input prompts as te, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys.

8. The Nine-Grid keyboard with the precise full-Pinyin input of the minimum syllable-oriented according to claim 1, wherein, when the WXYZ key marked as 9 of the main-level keyboard is clicked, the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

za, ya, and ye are in the first line, zh, yi, and yo are in the second line, and xi, yu, and xu are in the third line;

when the WXYZ key marked as 9 of the main-level keyboard is clicked, it is triggered to switch to the syllable-oriented input sub-keyboard of the full-mapping level, and input the prompt candidate initials w at the same time;

if the ya key of the above minimum syllable-oriented keys is clicked, the input correction prompts as ya, if the e key of the five additional vowel-finals keys is clicked, the input prompts as we, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys.

9. The Nine-Grid keyboard with the precise full-Pinyin input of the minimum syllable-oriented according to claim 1, wherein, the nine minimum syllable-oriented keys of eight full-mapping levels can be clicked input or long-pressed to pop up the extended keyboard slide input, the pop-up extended keyboards of the eight full-mapping levels oriented input sub-keyboards are:

the BCA related oriented input sub-keyboard has 6 pop-up expansion keyboards ba-4, ca-4, ce-2, co-2, bi-5, and cu-4;

the DFE related oriented input sub-keyboard has 7 pop-up expansion keyboards da-4, fa-2, 10 fe-3, di-6, de-3, fo-1, and du-4;

the GHI related oriented input sub-keyboard has 8 pop-up expansion keyboards ga-4, ha-4, he-3, go-2, ge-3, ho-2, gu-7, and hu-7;

the KJL related oriented input sub-keyboard has 8 pop-up expansion keyboards ka-4, la-4, le-2, li-8, ji-9, lo-2, lu-4, and ju-3;

the NMO related oriented input sub-keyboard has 7 pop-up extended keyboards na-4, ma-4, me-3, mi-6, ni-7, mo-1, and nu-3;

the PQRS related oriented input sub-keyboard has 7 pop-up expansion keyboards sa-4, ra-3, re-2, ro-2, qi-9, ru-4, and qu-3;

the TUV related oriented input sub-keyboard has 7 pop-up extended keyboards se-2, ta-4, ze-3, so-2, su-4, zo-2, and zu-4;

the WXYZ related oriented input sub-keyboard has 7 pop-up expansion keyboards za-4, ya-3, yi-2, yo-2, xi-9, yu-3, and xu-3;

wherein, the ba-4 indicates that the pop-up keyboard of ba has 4 keys, which are labeled as .i, .n, .o, and .ng respectively, the ba key is long pressed to slide to input beginning with ba the full-Pinyin of over 3 letters bai, ban, bao, and bang;

the ca-4 indicates that the pop-up keyboard of ca has 4 keys, which are labeled as .i, .n, .o, and .ng respectively, the ca key is long pressed to slide to input beginning with ca the full-Pinyin of over 3 letters cai, can, cao, and cang;

if the number of keys in the pop-up keyboard is greater than or equal to 6, it should be arranged in two lines, the sliding input can be achieved as long as the full-Pinyin beginning with the minimum syllable-oriented keys letters contains more than three letters, and so on to the end, the xu-3 indicates that the pop up keyboard of xu has 3 keys, which are labeled as .e, .n, and .an respectively, the xu key is long pressed to slide to input beginning with xu the full-Pinyin of over 3 letters xue, xun, and xuan.

10. The Nine-Grid keyboard with the precise full-Pinyin input of the minimum syllable-oriented according to claim 3, wherein, when the BCA key marked as 2 of the main-level keyboard is clicked the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

ba, ca, and ce are in the first line, ch, ci, and co are in the second line, and bi, cu, and bu are in the third line;

when the BCA key marked as 2 of the main-level keyboard is clicked, it is triggered to switch to the syllable-oriented input sub-keyboard of the full-mapping level, and input the prompt candidate initials b at the same time;

if the ca key of the above minimum syllable-oriented keys is clicked, the input correction prompts as ca, if the e key of the five additional vowel-finals keys is clicked, the input prompts as be, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys;

wherein, when the DFE key marked as 3 of the main-level keyboard is clicked the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

da, fa, and fe are in the first line, di, de, and fo are in the second line, and er, fu, and du are in the third line;

when the DFE key marked as 3 of the main-level keyboard is clicked, it is triggered to switch to the syllable-oriented input sub-keyboard of the full-mapping level, and input the prompt candidate initials d at the same time;

if the fa key of the above minimum syllable-oriented keys is clicked, the input correction prompts as fa, if the e key of the five additional vowel-finals keys is clicked, the input prompts as de, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys;

wherein, when the GHI key marked as 4 of the main-level keyboard is clicked the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

ga, ha, and he are in the first line, go, ge, and ho are in the second line, and gu, hu, and go are in the third line;

when the GHI key marked as 4 of the main-level keyboard is clicked, if the previous letter entered is n, then the direct input prompt will be g, indicating that the input syllable is not finished, ng may be combined into a compound finals, and the main level keyboard remains unchanged;

when the previous letter before inputting g is the other letter of excepting n or the previous symbol is the character terminator "'" of the Pinyin syllable, it is triggered to switch to the syllable-oriented input sub-keyboard of the full-mapping level, and input the prompt candidate initials g at the same time;

if the ha key of the above minimum syllable-oriented keys is clicked, the input correction prompts as ha, if the e key of the five additional vowel-finals keys is clicked, the input prompts as ge, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys;

wherein, when the KJL key marked as 5 of the main-level keyboard is clicked, the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

ka, la, and le are in the first line, li, ji, and lo are in the second line, and lv, lu, and ju are in the third line;

when the KJL key marked as 5 of the main-level keyboard is clicked, it is triggered to switch to the syllable-oriented input sub-keyboard of the full-mapping level, and input the prompt candidate initials k at the same time;

if the la key of the above minimum syllable-oriented keys is clicked, the input correction prompts as la, if the e key of the five additional vowel-finals keys is clicked, the input prompts as ke, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys;

wherein, when the NMO key marked as 6 of the main-level keyboard is clicked, the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

na, ma, and me are in the first line, mi, ni, and mo are in the second line, and nv, mu, and nu are in the third line;

if the previous letter inputted is a vowel-finals a, e, u, i, and o or the first two letters of the input are a special combination of double-finals ia, io, and ua, then the direct input prompt will be n, indicating that the input syllable is not finished, n may be combined into a compound finals, and the main level keyboard remains unchanged;

when the previous letter before inputting n is the other letter of excepting vowel-finals a, e, u, i, o and the first two letters of the input are other combination of excepting double-finals ia, io, and ua, or the previous symbol is the character terminator "'" of the Pinyin syllable, it is triggered to switch to the syllable-oriented input sub-keyboard of the full-mapping level, and input the prompt candidate initials n at the same time;

if the ma key of the above minimum syllable-oriented keys is clicked, the input correction prompts as ma, if the e key of the five additional vowel-finals keys is clicked, the input prompts as ne, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys.

11. The Nine-Grid keyboard with the precise full-Pinyin input of the minimum syllable-oriented according to claim 3, wherein, when the PQRS key marked as 7 of the main-level keyboard is clicked the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

sa, ra, and re are in the first line, sh, ri, and ro are in the second line, and qi, ru, and qu are in the third line;

when the PQRS key marked as 7 of the main-level keyboard is clicked, it is triggered to switch to the syllable-oriented input sub-keyboard of the full-mapping level, and input the prompt candidate initials p at the same time;

if the ra key of the above minimum syllable-oriented keys is clicked, the input correction prompts as ra, if the e key of the five additional vowel-finals keys is clicked, the input prompts as pe, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys.

12. The Nine-Grid keyboard with the precise full-Pinyin input of the minimum syllable-oriented according to claim 5, wherein, when the PQRS key marked as 7 of the main-level keyboard is clicked the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

sa, ra, and re are in the first line, sh, ri, and ro are in the second line, and qi, ru, and qu are in the third line;

when the PQRS key marked as 7 of the main-level keyboard is clicked, it is triggered to switch to the syllable-oriented input sub-keyboard of the full-mapping level, and input the prompt candidate initials p at the same time;

if the ra key of the above minimum syllable-oriented keys is clicked, the input correction prompts as ra, if the e key of the five additional vowel-finals keys is clicked, the input prompts as pe, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys.

13. The Nine-Grid keyboard with the precise full-Pinyin input of the minimum syllable-oriented according to claim 5, wherein, when the TUV key marked as 8 of the main-level keyboard is clicked, the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

se, ta, and ze are in the first line, si, so, and zi are in the second line, and su, zo, and zu are in the third line;

when the TUV key marked as 8 of the main-level keyboard is clicked, it is triggered to switch to the syllable-oriented input sub-keyboard of the full-mapping level, and input the prompt candidate initials t at the same time;

if the ze key of the above minimum syllable-oriented keys is clicked, the input correction prompts as ze, If the e key of the five additional vowel-finals keys is clicked, the input prompts as te, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys.

14. The Nine-Grid keyboard with the precise full-Pinyin input of the minimum syllable-oriented according to claim 3, wherein, when the WXYZ key marked as 9 of the main-level keyboard is clicked, the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

za, ya, and ye are in the first line, zh, yi, and yo are in the second line, and xi, yu, and xu are in the third line;

when the WXYZ key marked as 9 of the main-level keyboard is clicked, it is triggered to switch to the syllable-oriented input sub-keyboard of the full-mapping level, and input the prompt candidate initials w at the same time;

if the ya key of the above minimum syllable-oriented keys is clicked, the input correction prompts as ya, if the e key of the five additional vowel-finals keys is clicked, the input prompts as we, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys.

15. The Nine-Grid keyboard with the precise full-Pinyin input of the minimum syllable-oriented according to claim 5, wherein, when the WXYZ key marked as 9 of the main-level keyboard is clicked, the layout and trigger switching of the syllable-oriented input sub-keyboard of this full-mapping level are as follows:

the nine minimum syllable-oriented keys of the mapping level are arranged in a three-row, three-column, and the Nine-Grid arrangement:

za, ya, and ye are in the first line, zh, yi, and yo are in the second line, and xi, yu, and xu are in the third line;

when the WXYZ key marked as 9 of the main-level keyboard is clicked, it is triggered to switch to the syllable-oriented input sub-keyboard of the full-mapping level, and input the prompt candidate initials w at the same time;

if the ya key of the above minimum syllable-oriented keys is clicked, the input correction prompts as ya, if the e key of the five additional vowel-finals keys is clicked, the input prompts as we, any click input of the input sub-keyboards of full-mapping levels results in the switch to the main-level keyboard, and the precise full-Pinyin input can be realized on the Nine-Grid keyboard through the minimum syllable-oriented and five additional vowel-finals keys.

* * * * *